(12) United States Patent
Weber et al.

(10) Patent No.: US 8,889,767 B2
(45) Date of Patent: *Nov. 18, 2014

(54) THERMOPLASTIC MOLDING COMPOUNDS BASED ON STYRENE COPOLYMERS AND POLYAMIDES HAVING IMPROVED WEATHERING RESISTANCE

(75) Inventors: Martin Weber, Maikammer (DE); Marko Blinzler, Mannheim (DE); Christian Schweiger, Wilhelmsfeld (DE); Christoph Schneidereit, Ludwigshafen (DE)

(73) Assignee: Styrolution GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/148,399

(22) PCT Filed: Jan. 29, 2010

(86) PCT No.: PCT/EP2010/051097
§ 371 (c)(1),
(2), (4) Date: Aug. 8, 2011

(87) PCT Pub. No.: WO2010/089258
PCT Pub. Date: Aug. 12, 2010

(65) Prior Publication Data
US 2011/0306701 A1 Dec. 15, 2011

(30) Foreign Application Priority Data
Feb. 6, 2009 (EP) .................................... 09152296

(51) Int. Cl.
| | | |
|---|---|---|
| C08J 3/20 | (2006.01) | |
| C08K 5/15 | (2006.01) | |
| C08L 25/08 | (2006.01) | |
| C08L 77/00 | (2006.01) | |
| C08L 25/04 | (2006.01) | |
| C08F 285/00 | (2006.01) | |
| C08L 21/00 | (2006.01) | |
| C08L 35/06 | (2006.01) | |
| C08L 25/12 | (2006.01) | |
| C08K 7/02 | (2006.01) | |
| C08L 55/02 | (2006.01) | |

(52) U.S. Cl.
CPC .............. *C08F 285/00* (2013.01); *C08L 35/06* (2013.01); *C08L 25/12* (2013.01); *C08L 25/08* (2013.01); *C08K 7/02* (2013.01); *C08L 77/00* (2013.01); *C08L 25/04* (2013.01); *C08L 55/02* (2013.01); *C08L 21/00* (2013.01)
USPC ........... 523/351; 523/348; 524/107; 524/504; 525/66

(58) Field of Classification Search
CPC ......... C08L 25/02; C08L 25/04; C08L 25/08; C08L 25/12; C08L 33/20; C08K 3/40; C08K 7/02; C08K 3/0033; C08K 3/0058

USPC .............. 523/348, 351; 525/66; 524/107, 504
See application file for complete search history.

(56) References Cited

U.S. PATENT DOCUMENTS

| | | | |
|---|---|---|---|
| 4,537,949 A | 8/1985 | Schmidt et al. | |
| 4,540,772 A | 9/1985 | Pipper et al. | |
| 4,873,289 A | 10/1989 | Lindner et al. | |
| 5,272,236 A | 12/1993 | Lai et al. | |
| 6,423,817 B1 | 7/2002 | Weinerth et al. | |
| 6,733,854 B2* | 5/2004 | Lee et al. ..................... | 428/35.8 |
| 6,812,323 B1 | 11/2004 | Breiner et al. | |
| 7,671,127 B2* | 3/2010 | Weber et al. .................. | 524/504 |
| 7,919,013 B2* | 4/2011 | Weber et al. .................. | 252/502 |
| 2007/0106022 A1* | 5/2007 | Weber et al. .................... | 525/66 |
| 2010/0036043 A1* | 2/2010 | Weber et al. .................. | 524/504 |
| 2010/0130685 A1 | 5/2010 | Weber et al. | |
| 2011/0178205 A1* | 7/2011 | Weber et al. .................. | 523/348 |
| 2011/0319550 A1* | 12/2011 | Weber et al. .................. | 524/514 |

FOREIGN PATENT DOCUMENTS

| | | | |
|---|---|---|---|
| DE | 4407485 | A1 | 9/1995 |
| DE | 19812135 | A1 | 9/1999 |
| DE | 10024935 | A1 | 11/2001 |
| EP | 0038094 | A2 | 10/1981 |
| EP | 0038582 | A2 | 10/1981 |
| EP | 0039524 | A1 | 11/1981 |
| EP | 129195 | A2 | 12/1984 |

(Continued)

OTHER PUBLICATIONS

International Search Report, PCT/EP2010/051907, mailed May 4, 2010.
Translation of the International Preliminary Report on Patentability dated Aug. 9, 2011.

*Primary Examiner* — Hannah Pak
(74) *Attorney, Agent, or Firm* — Drinker Biddle & Reath LLP

(57) ABSTRACT

The thermoplastic molding composition comprises
 a) as component A, from 3 to 78% by weight of one or more styrene copolymers which have no units derived from maleic anhydride,
 b) as component B, from 15 to 90% by weight of one or more polyamides,
 c) as component C, from 5 to 50% by weight of one or more impact-modifying graft rubbers without olefinic double bonds in the rubber phase,
 d) as component D, from 1 to 25% by weight of one or more styrene copolymers which have, based on the entire component D, from 0.5 to 5% by weight of units derived from maleic anhydride,
 e) as component E, from 1 to 30% by weight of one or more further rubbers based on olefinic monomers without core-shell structure, and having at least 0.1% by weight of functional monomers,
 f) as component F, from 0 to 50% by weight of one or more fibrous or particulate fillers,
 g) as component G, from 0 to 40% by weight of further additives,
where the entire amount of components A to E and, if appropriate, F and G is 100% by weight.

11 Claims, No Drawings

(56) References Cited

FOREIGN PATENT DOCUMENTS

| | | |
|---|---|---|
| EP | 129196 A2 | 12/1984 |
| EP | 0 208 187 A2 | 1/1987 |
| EP | 0784080 A1 | 7/1997 |
| WO | WO-95/28443 A1 | 10/1995 |
| WO | WO-99/41297 A1 | 8/1999 |
| WO | WO-2004007468 A1 | 1/2004 |
| WO | WO-2004071445 A2 | 8/2004 |
| WO | WO-2005/040281 A1 | 5/2005 |
| WO | WO-2006063709 A1 | 6/2006 |
| WO | WO-2006082001 A1 | 8/2006 |

\* cited by examiner

THERMOPLASTIC MOLDING COMPOUNDS BASED ON STYRENE COPOLYMERS AND POLYAMIDES HAVING IMPROVED WEATHERING RESISTANCE

CROSS-REFERENCE TO RELATED APPLICATIONS

This application is a national stage application (under 35 U.S.C. §371) of PCT/EP2010/051097, filed Jan. 29, 2010, which claims benefit of EP 09152296.1, filed Feb. 6, 2009.

BACKGROUND OF THE INVENTION

The invention relates to thermoplastic molding compositions comprising styrene copolymers and comprising polyamides, to processes for their production, and to their use, and also to moldings, fibers, and foils produced therefrom.

Polymeric blends composed of styrene copolymers and of polyamides are known per se. Binary blends composed of polyamides and of styrene copolymers have very poor toughness values, due to the incompatibility of polyamide with, for example, styrene-acrylonitrile polymer. The toughness of blends can be raised significantly by using functionalized styrene-acrylonitrile copolymers (SAN copolymers). Products of this type moreover have interesting properties such as high impact resistance, and good flowability, and chemicals resistance. Particularly suitable compatibilizers are styrene-acrylonitrile-maleic anhydride terpolymers, styrene-N-phenylmaleimide-maleic anhydride terpolymers, and methyl methacrylate-maleic anhydride copolymers. It is assumed that the amino or carboxy end groups of the polyamides react with the functional groups of the co- and terpolymers mentioned, with in-situ production of copolymers which bring about the compatibility between the styrene copolymer phase and the polyamide phase. Polymer mixtures of this type with a modified interface are generally termed polymer alloys.

The styrene copolymer-polyamide blends known hitherto have insufficient UV resistance for many applications. Weathering resistance can by way of example be improved by use of impact modifiers which have no olefinic double bonds. The use of these can lead not only to higher materials costs but also to a significant reduction in notched impact resistance at low temperatures. Another possibility is to use polyamides having sterically hindered piperidine end groups as HALS stabilizers. However, when processing conditions are unfavorable, use of, for example, molding compositions comprising triacetonediamine (TAD) leads to a reduction in fracture energy at low temperatures.

WO 2005/040281 discloses thermoplastic molding compositions which comprise polyamide having TAD end groups, styrene-acrylonitrile-maleic anhydride terpolymers, graft rubbers, and, frequently, phthalic anhydride. The property profile of the molding compositions described is not ideal for all applications.

BRIEF SUMMARY OF THE INVENTION

It is an object of the present invention to provide thermoplastic molding compositions which are based on styrene copolymers and polyamides with improved colorfastness and good flowability, and also good impact resistance at ambient temperature and at low temperatures, and also improved fracture energy at low temperatures. The materials are intended not to exhibit any tiger-stripe texture after injection molding, and to be weathering-resistant.

According to the invention, the object is achieved via a thermoplastic molding composition comprising
a) as component A, from 3 to 78% by weight of one or more styrene copolymers which have no units derived from maleic anhydride,
b) as component B, from 15 to 90% by weight of one or more polyamides,
c) as component C, from 5 to 50% by weight of one or more impact-modifying graft rubbers without olefinic double bonds in the rubber phase,
d) as component D, from 1 to 25% by weight of one or more styrene copolymers which have, based on the entire component D, from 0.5 to 5% by weight of units derived from maleic anhydride,
e) as component E, from 1 to 30% by weight of one or more further rubbers based on olefinic monomers without core-shell structure, and having at least 0.1% by weight of functional monomers,
f) as component F, from 0 to 50% by weight of one or more fibrous or particulate fillers,
g) as component G, from 0 to 40% by weight of further additives,
where the entire amount of components A to E and, if appropriate, F and G is 100% by weight.

DETAILED DESCRIPTION OF THE INVENTION

According to the invention, it has been found that a specific combination of styrene copolymers and polyamide with a specific proportion of styrene copolymers comprising maleic anhydride units and with functional rubbers alongside graft rubbers leads to the advantages of the invention.

The proportion of component A in the thermoplastic molding compositions is from 3 to 78% by weight, preferably from 8 to 52% by weight, in particular from 10 to 30% by weight.

The amount of component B comprised in the thermoplastic molding compositions is from 15 to 90% by weight, preferably from 25 to 55% by weight, in particular from 35 to 45% by weight.

The amount of component C comprised in the thermoplastic molding compositions is from 5 to 50% by weight, preferably from 15 to 45% by weight, in particular from 20 to 35% by weight.

The amount of component D comprised in the thermoplastic molding compositions is from 1 to 25% by weight, preferably from 2 to 10% by weight, in particular from 3 to 7% by weight.

The amount of component E comprised in the thermoplastic molding compositions is from 1 to 30% by weight, preferably from 1.5 to 10% by weight, in particular from 2 to 5% by weight.

The amount of component F comprised in the thermoplastic molding compositions is from 0 to 50% by weight, preferably from 0 to 25% by weight, in particular from 0 to 8% by weight. If component F is present, its minimum amount comprised is preferably 0.1%.

The amount of component G comprised in the thermoplastic molding compositions is from 0 to 40% by weight, preferably from 0 to 30% by weight, in particular from 0 to 17% by weight. If component G is present, its minimum amount is 0.1% by weight.

If one or more of components F or G is/are present, the maximum possible amount of components A to E is correspondingly reduced by the minimum amount of components F and/or G, thus always giving a total amount of 100% by weight.

Component A

The thermoplastic molding compositions of the invention comprise, as component A, one or more styrene copolymers which have no units derived from maleic anhydride. Any desired suitable comonomers can be present alongside styrene here in the copolymers. Preference is given to styrene-acrylonitrile copolymer or α-methylstyrene-acrylonitrile copolymer.

In principle, any of the styrene-acrylonitrile copolymers, α-methylstyrene-acrylonitrile copolymers, or a mixture thereof which are known to the person skilled in the art and are described in the literature can be used as component A of the thermoplastic matrix M, as long as the intrinsic viscosity IV of the mixtures thereof (measured to DIN 53727 at 25° C. as a 0.5% strength by weight solution in dimethylformamide; this method also applying to all of the intrinsic viscosities IV mentioned hereinafter) is smaller than or equal to 85 ml/g.

Preferred components A are composed of from 50 to 90% by weight, preferably from 60 to 80% by weight, in particular from 65 to 78% by weight, of styrene, and from 10 to 50% by weight, preferably from 20 to 40% by weight, in particular from 22 to 35% by weight of acrylonitrile, and also from 0 to 5% by weight, preferably from 0 to 4% by weight, in particular from 0 to 3% by weight, of further monomers, where each of the % by weight values is based on the weight of component A, and they give a total of 100% by weight.

Further preferred components A are composed of from 50 to 90% by weight, preferably from 60 to 80% by weight, in particular from 65 to 78% by weight, of α-methylstyrene, and from 10 to 50% by weight, preferably from 20 to 40% by weight, in particular from 22 to 35% by weight, of acrylonitrile, and also from 0 to 5% by weight, preferably from 0 to 4% by weight, in particular from 0 to 3% by weight, of further monomers, where each of the % by weight values is based on the weight of component A, and they give a total of 100% by weight.

Equally preferred components A are mixtures of said styrene-acrylonitrile copolymers and of said α-methylstyrene-acrylonitrile copolymers.

Abovementioned further monomers that can be used are any of the copolymerizable monomers which differ from maleic anhydride, examples being p-methylstyrene, tert-butylstyrene, vinylnaphthaline, alkyl acrylates and/or alkyl methacrylates, for example those having $C_1$-$C_8$-alkyl radicals, N-phenylmaleimide, or a mixture thereof.

The copolymers of component A can be produced by methods known per se. By way of example, they can be produced via free-radical polymerization, in particular via emulsion polymerization, suspension polymerization, solution polymerization, or bulk polymerization.

The styrene copolymers are preferably rubber-free.

Component B

The thermoplastic molding compositions of the invention comprise, as component B, one or more polyamides preferably having, based on the entire component B, from 0.05 to 0.5% by weight, with preference from 0.1 to 0.2% by weight, of triacetonediamine (TAD) end groups.

These can be TAD-free polyamides, TAD-containing polyamides, or else a mixture of polyamides having TAD end groups with polyamides without TAD end groups. It is preferable that the total amount of triacetonediamine end groups present is from 0.1 to 0.2% by weight, based on component B. It is preferable that the amount of TAD end groups present is from 0.14 to 0.18% by weight, in particular from 0.15 to 0.17% by weight.

According to the invention, the component B used comprises a polyamide having at least one end group that can derive from the piperidine compound TAD. It is also possible to use, as component B, a mixture composed of two or more different polyamides. By way of example, polyamides having a different underlying structure but having an identical end group can be used. However, it is also possible to use polyamides having the same underlying skeleton and having end groups which derive from different piperidine compounds. In another possibility, a mixture is used, composed of polyamides which have different contents of end groups which derive from the piperidine compounds.

Polyamides are homopolymeric or copolymeric, synthetic long-chain polyamides in which repeating amide groups are an essential constituent of the main polymer chain. Examples of these polyamides are nylon-6 (polycaprolactam), nylon-6,6 (polyhexamethyleneadipamide), nylon-4,6 (polytetramethyleneadipamide), nylon-5,10 (polypentamethyleneadipamide), nylon-6,10 (polyhexamethylenesebacamide), nylon-7 (polyenantholactam), nylon-11 (polyundecanolactam), nylon-12 (polydodecanolactam). As is known, these polyamides have the generic name nylon.

There are in principle two processes for producing polyamides.

Polymerization starting from dicarboxylic acids and from diamines, as with polymerization starting from amino acids, reacts the amino and carboxy end groups of the starting monomers or starting oligomers with one another to form an amide group and water. The water can then be removed from the polymeric material. The polymerization starting from carboxamides reacts the amino and amide end groups of the starting monomers or starting oligomers with one another to form an amide group and ammonia. The ammonia can then be removed from the polymeric material.

Examples of suitable starting monomers or starting oligomers for preparing polyamides are (1) $C_2$-$C_{20}$, preferably $C_3$-$C_{18}$, amino acids, such as 6-aminocaproic acid, 11-amino-undecanoic acid, and also dimers, trimers, tetramers, pentamers and hexamers thereof, (2) amides of $C_2$-$C_{20}$ amino acids, for example 6-aminocaproamide, 11-amino-undecanamide, and also dimers, trimers, tetramers, pentamers and hexamers of these, (3) products of the reaction of
  (3a) $C_2$-$C_{20}$, preferably $C_2$-$C_{12}$, alkylenediamines, such as tetramethylenediamine or preferably hexamethylenediamine,
  with
  (3b) a $C_2$-$C_{20}$, preferably $C_2$-$C_{14}$, aliphatic dicarboxylic acid, such as sebacic acid, decanedicarboxylic acid or adipic acid, and also dimers, trimers, tetramers, pentamers and hexamers of these reaction products, (4) products of the reaction of (3a) with
  (4b) a $C_8$-$C_{20}$, preferably $C_8$-$C_{12}$, aromatic dicarboxylic acid or derivatives thereof, for example chlorides, e.g. 2,6-naphthalenedicarboxylic acid, preferably isophthalic acid or terephthalic acid,
and also dimers, trimers, tetramers, pentamers and hexamers of these reaction products, (5) products of the reaction of (3a) with
  (5b) a $C_9$-$C_{20}$, preferably $C_9$-$C_{18}$, arylaliphatic dicarboxylic acid or derivatives thereof, for example chlorides, e.g. o-, m- or p-phenylenediacetic acid,
and also dimers, trimers, tetramers, pentamers and hexamers of these reaction products, (6) products of the reaction of
  (6a) $C_6$-$C_{20}$, preferably $C_6$-$C_{10}$, aromatic diamines, such as m- or p-phenylene-diamine, with (3b), and also dimers, trimers, tetramers, pentamers and hexamers of these reaction products, (7) products of the reaction of (7a) $C_7$-$C_{20}$, preferably $C_8$-$C_{18}$, arylaliphatic diamines, such as m- or p-xylylene-diamine, with (3b), and also dimers, trimers, tetramers, pentamers and hexamers of these reaction products, and (8) monomers or oligomers of a $C_2$-$C_{20}$, preferably $C_2$-$C_{18}$, arylaliphatic or preferably aliphatic lactam, such as enantholactam, undecanolactam, dodecanolactam or caprolactam, and also homopolymers or copolymers or mixtures of these starting monomers or starting oligomers.

Preference is given here to those starting monomers or starting oligomers which polymerize to give the polyamides nylon-6, nylon-6,6, nylon-4,6, nylon-5,10, nylon-6,10, nylon-7, nylon-11, or nylon-12, in particular to give nylon-6 or nylon-6,6.

The triacetonediamine (TAD) end groups which are, if appropriate, present derive from 4-amino-2,2,6,6-tetramethylpiperidine. The TAD can have been linked to the polyamide by way of an amino or carboxy group. By way of example, therefore, a possible compound is 4-carboxy-2,2,6,6-tetramethylpiperidine.

The production of the polyamides B is known per se or can use processes known per se. The polymerization or polycondensation of the starting monomers can therefore by way of example be undertaken in the presence of the piperidine compounds, under conventional process conditions, and the reaction here can take place continuously or batchwise. However, the piperidine compounds—if present—can also be combined with the type of chain regulator usually used for the production of polyamides. Information concerning suitable processes is found by way of example in WO 95/28443, WO 99/41297, or DE-A 198 12 135. The TAD compound is bonded to the polyamide via reaction of at least one of the amide-forming groups $R^7$. Steric hindrance prevents the secondary amino groups of the piperidine ring systems from reacting here.

It is also possible to use polyamides that have been produced via copolycondensation or two or more of the above-mentioned monomers or their components, e.g. copolymers composed of adipic acid, isophthalic acid, or terephthalic acid and hexamethylenediamine, or copolymers composed of caprolactam, terephthalic acid, and hexamethylenediamine. These semiaromatic copolyamides comprise from 40 to 90% by weight of units which derive from terephthalic acid and from hexamethylenediamine. A small proportion of the terephthalic acid, preferably not more than 10% by weight of the entire aromatic dicarboxylic acids used, can be replaced by isophthalic acid or other aromatic dicarboxylic acids, preferably those in which the carboxy groups are in para-position.

A semiaromatic polyamide is nylon-9,T, which derives from nonanediamine and terephthalic acid.

Other monomers that can be used are cyclic diamines, such as those of the general formula V

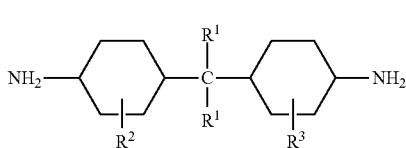

(V)

in which $R^1$ is hydrogen or a $C_1$-$C_4$-alkyl group, $R^2$ is a $C_1$-$C_4$-alkyl group or hydrogen, and $R^3$ is a $C_1$-$C_4$-alkyl group or hydrogen.

Particularly preferred diamines V are bis(4-aminocyclohexyl)methane, bis(4-amino-3-methylcyclohexyl)methane, bis(4-aminocyclohexyl)-2,2-propane or bis(4-amino-3-methylcyclohexyl)-2,2-propane.

Other diamines V that may be mentioned are 1,3- or 1,4-cyclohexanediamine or isophoronediamine. The semiaromatic copolyamides comprise, alongside the units which derive from terephthalic acid and from hexamethylenediamine, units which derive from ε-caprolactam, and/or units which derive from adipic acid and from hexamethylenediamine.

The proportion of units which derive from ε-caprolactam is up to 50% by weight, preferably from 20 to 50% by weight, in particular from 25 to 40% by weight, whereas the proportion of units which derive from adipic acid and from hexamethylenediamine is up to 60% by weight, preferably from 30 to 60% by weight, and in particular from 35 to 55% by weight.

It is also possible that the copolyamides comprise not only units of ε-caprolactam but also units of adipic acid and hexamethylenediamine; in this case, care has to be taken that the proportion of units free from aromatic groups is at least 10% by weight, preferably at least 20% by weight. There is no particular restriction here on the ratio of the units which derive from ε-caprolactam and from adipic acid and from hexamethylenediamine.

Materials which have proven particularly advantageous for many applications are polyamides having from 50 to 80% by weight, in particular from 60 to 75% by weight, of units which derive from terephthalic acid and from hexamethylenediamine, and having from 20 to 50% by weight, preferably from 25 to 40% by weight, of units which derive from ε-caprolactam.

The semiaromatic copolyamides can by way of example be produced by the processes described in EP-A-129 195 and EP-A-129 196.

Preferred semiaromatic polyamides are those whose content of triamine units, in particular units of dihexamethylenetriamine, is below 0.555% by weight. Particular preference is given to those semiaromatic polyamides whose triamine contents are 0.3% by weight or less.

Preference is given to linear polyamides whose melting point is above 200° C.

Preferred polyamides are polyhexamethyleneadipamide, polyhexamethylenesebacamide and polycaprolactam, and also nylon-6/6,T and nylon-6,6/6,T, and also polyamides which comprise cyclic diamines as comonomers. The relative viscosity of the polyamides is generally from 2.0 to 5, determined in a 1% strength by weight solution in 96% strength sulfuric acid at 23° C., corresponding to a molecular weight (number average) of about 15 000 to 45 000. Preference is given to use of polyamides whose relative viscosity is from 2.4 to 3.5, in particular from 2.5 to 3.4.

Mention may also be made of polyamides obtainable by way of example via condensation of 1,4-diaminobutane with adipic acid at an elevated temperature (nylon-4,6). Production processes for polyamides of this structure are described by way of example in EP-A 38 094, EP-A 38 582, and EP-A 39 524.

Component C

The thermoplastic molding compositions comprise, as component C, impact-modifying graft rubbers without olefinic double bonds in the rubber phase. For the purposes of the invention, graft rubbers are core-shell rubbers which can also have a multishell structure. It is possible here to use conventional impact modifiers suitable for polyamides.

The core-shell graft rubbers are graft rubbers which are produced in emulsion and which are composed of at least one hard and one soft constituent. A hard constituent is usually a polymer whose glass transition temperature is at least 25° C., and a soft constituent is usually a polymer whose glass transition temperature is at most 0° C., preferably below −20° C., particularly preferably below −40° C. These products have a structure composed of a core and of at least one shell, and the structure here is the result of the sequence of addition of the monomers. The soft constituents derive inter alia from alkyl acrylates, alkyl methacrylates, EPDM, or siloxanes, and, if appropriate, from further comonomers. Suitable siloxane cores can by way of example be produced from cyclic oligomeric octamethyltetrasiloxane or tetravinyltetramethyltetrasiloxane, or tetravinyltetramethyltetrasiloxane. These can by way of example be reacted with γ-mercaptopropylmethyldimethoxysilane in a ring-opening cationic polymerization reaction, preferably in the presence of sulfonic acids, to give the soft siloxane cores. The siloxanes can also be crosslinked, for example by carrying out the polymerization reaction in the presence of silanes having hydrolyzable groups, such as halogen or alkoxy groups, examples being tetraethoxysilane, methyltrimethoxysilane, or phenyltrimethoxysilane. Examples of suitable comonomers that may be mentioned here are styrene, acrylonitrile, and crosslinking or graft-active monomers having more than one polymerizable double bond, e.g. diallyl phthalate, divinylbenzene, butanediol diacrylate or triallyl(iso)cyanurate. The hard constituents derive inter alia from styrene, α-methylstyrene, and copolymers of these, and preferred comonomers that may be listed here are acrylonitrile, methacrylonitrile, and methyl methacrylate.

Preferred core-shell graft rubbers comprise a soft core and a hard shell, or a hard core, a first soft shell, and at least one further hard shell. According to the invention, it is possible here to incorporate functional groups, such as carbonyl groups, carboxylic acid groups, anhydride groups, carboxamide groups, carboximide groups, carboxylic ester groups, amino groups, hydroxy groups, epoxy groups, oxazoline groups, urethane groups, urea groups, lactam groups, or halobenzyl groups, and this is preferably achieved here via addition of suitably functionalized monomers during the polymerization of the final shell. Examples of suitable functionalized monomers are maleic acid, maleic anhydride, mono- or diesters of maleic acid, tert-butyl(meth)acrylate, acrylic acid, glycidyl(meth)acrylate, and vinyloxazoline. The proportion of monomers having functional groups, insofar as these are present, is generally from 0.1 to 25% by weight, preferably from 0.25 to 15% by weight, based on the total weight of the core-shell graft rubber. The ratio by weight of soft to hard constituents is generally from 1:9 to 9:1, preferably from 3:7 to 8:2. It is preferable that no functional groups are present, i.e. that no concomitant use is made of functionalized monomers.

Rubbers of this type which increase the toughness of polyamides are known per se and are described by way of example in EP-A 208 187.

According to the invention, the materials are graft rubbers which comprise no ethylenically unsaturated hydrocarbon residues (olefinic double bonds). Particular preference is given to ASA rubbers (acrylonitrile-styrene-alkyl acrylate rubbers).

The polymerization of the hard phase also produces subordinate amounts of ungrafted fractions. These are counted as part of the hard phase. It is also possible to use a mixture of various rubbers where the soft-phase fractions of the rubbers used preferably differ by at least 5% by weight.

Component D

The thermoplastic molding compositions of the invention comprise, as component D, styrene copolymers which have, based on the entire component D, from 0.5 to 5% by weight, preferably from 1.0 to 2.5% by weight, in particular from 1.9 to 2.3% by weight, of units derived from maleic anhydride. This proportion is particularly preferably from 2.0 to 2.2% by weight, specifically about 2.1% by weight.

It is particularly preferable that component D is a styrene-acrylonitrile-maleic anhydride terpolymer or styrene-N-phenylmaleimide-maleic anhydride terpolymer.

The proportion of acrylonitrile in the terpolymer, based on the entire terpolymer, is preferably from 10 to 30% by weight, particularly preferably from 15 to 30% by weight, in particular from 20 to 25% by weight. The residue is composed of styrene.

The molar masses $M_w$ of the copolymers are generally from 30 000 to 500 000 g/mol, preferably from 50 000 to 250 000 g/mol, in particular from 70 000 to 200 000 g/mol, determined via GPC, using tetrahydrofuran (THF) as eluent, and using polystyrene calibration.

The copolymers can be produced via free-radical-generating polymerization of the corresponding monomers. The production process is explained in more detail by way of example in WO 2005/040281, page 10, line 31 to page 11, line 8.

It is moreover also possible to use styrene-N-phenylmaleimide-maleic anhydride terpolymers. Reference can also be made to the descriptions in EP-A-0 784 080, and also DE-A-100 24 935, and to DE-A-44 07 485, the description of component B of that specification, on pages 6 and 7.

Component E

The thermoplastic molding compositions of the invention comprise further rubbers, as component E. The further rubber(s) is/are based on olefinic monomers without core-shell structure, and they have at least 0.1% by weight of functional monomers. The expression "based on" means that most of the rubber derives from olefinic monomers (at least 60% by weight, preferably at least 80% by weight, in particular at least 90% by weight). The rubber has at least 0.1% by weight of functional monomers. These are monomers which comprise a functional group which in particular is capable of forming bonds with the polyamide of component B. Preference is given here to formation of covalent bonds. It is preferable that the functional groups comprised in the functional monomers have been selected from carboxylic acid groups, carboxylic anhydride groups, carboxylic ester groups, carboxamide groups, carboximide groups, amino groups, hydroxy groups, epoxy groups, urethane groups, and oxazoline groups, and mixtures of these.

Component E is preferably a copolymer composed of
  e1) from 35 to 89.95% by weight of ethylene, as component E1,
  e2) from 10 to 60% by weight of 1-octene, 1-butene, propene, or a mixture thereof, as component E2, and
  e3) from 0.05 to 5% by weight of functional monomers, where the monomers bear functional groups selected from carboxylic acid groups, carboxylic anhydride groups, carboxylic ester groups, carboxamide groups, carboximide groups, amino groups, hydroxy groups, epoxide groups, urethane groups, or oxazoline groups, and mixtures of these, as component E3.

The proportion of the functional groups E3 here is from 0.1 to 5% by weight, preferably from 0.2 to 4% by weight, and in particular from 0.3 to 3.5% by weight, based on the total weight of component E.

Particularly preferred components E3 are composed of an ethylenically unsaturated mono- or dicarboxylic acid, or a functional derivative of this type of acid.

In principle, any of the primary, secondary and tertiary $C_1$-$C_{18}$-alkyl esters of acrylic or methacrylic acid is suitable, but preference is given to esters having from 1 to 12 carbon atoms, in particular having from 2 to 10 carbon atoms.

Examples here are methyl, ethyl, propyl, n-butyl, isobutyl, and tert-butyl, 2-ethylhexyl, octyl, and decyl acrylates, and the corresponding methacrylates. Among these, particular preference is given to n-butyl acrylate and 2-ethylhexyl acrylate.

Instead of the esters, or in addition to these, it is also possible that the olefin polymers comprise acid-functional and/or latently acid-functional monomers of ethylenically unsaturated mono- or dicarboxylic acids, or monomers having epoxy groups.

Further examples that may be mentioned of monomers E3 are acrylic acid, methacrylic acid, tertiary alkyl esters of these acids, in particular tert-butyl acrylate, and dicarboxylic acids, such as maleic acid and fumaric acid, and derivatives of said acids, and also their monoesters.

Latently acid-functional monomers are those compounds which form free acid groups under the polymerization conditions or during the incorporation of the olefin polymers into the molding compositions. Examples that may be mentioned of these are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The acid-functional or latently acid-functional monomers, and the monomers comprising epoxy groups, are preferably incorporated into the olefin polymers via addition of compounds of the general formulae I-IV to the monomer mixture.

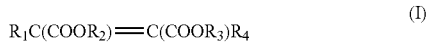 (I)

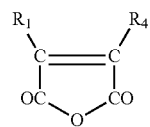 (II)

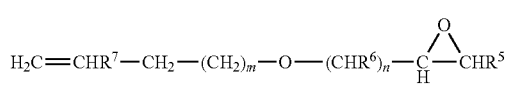 (III)

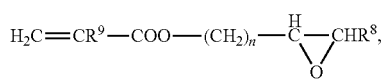 (IV)

where the radicals $R_1$-$R_4$ and $R^5$-$R^9$ are hydrogen or alkyl groups having from 1 to 6 carbon atoms, and m is a whole number from 0 to 20, and n is a whole number from 0 to 10.

Hydrogen is preferred for $R_1$-$R_4$ and $R^5$-$R^7$, the value 0 or 1 is preferred for m, and the value 1 is preferred for n. The corresponding compounds are maleic acid, fumaric acid, maleic anhydride, and, respectively, alkenyl glycidyl ethers or vinyl glycidyl ethers.

Preferred compounds of the formulae I, II, III, and IV are maleic acid and maleic anhydride as component E3 and esters of acrylic acid and/or methacrylic acid comprising epoxy groups, particular preference being given here to glycidyl acrylate and glycidyl methacrylate (as component E3).

Particular preference is given to olefin polymers composed of from 50 to 89.8% by weight of ethylene, preferably from 55 to 85.7% by weight,
from 10 to 50% by weight of 1-butene, preferably from 14 to 44% by weight,
from 0.2 to 2% by weight of acrylic acid or maleic acid or maleic anhydride, preferably
from 0.3 to 1% by weight,
or
from 40 to 69.9% by weight of ethylene, preferably from 50 to 64.9% by weight,
from 30 to 60% by weight of 1-octene, preferably from 35 to 49% by weight,
from 0.05 to 2% by weight of acrylic acid or maleic acid or maleic anhydride, preferably
from 0.1 to 1% by weight.

The production of the ethylene copolymers described above can take place by processes known per se, preferably via random copolymerization at high pressure and elevated temperature.

The molar mass of these ethylene-α-olefin copolymers is from 10 000 to 500 000 g/mol, preferably from 15 000 to 400 000 g/mol (Mn, determined by means of GPC in 1,2,4-trichlorobenzene, using PS calibration).

In one particular embodiment, ethylene-α-olefin copolymers produced by means of what is known as "single site catalysts" are used. Further details can be found in U.S. Pat. No. 5,272,236. In this case, the ethylene-α-olefin copolymers have a molecular-weight polydispersity smaller than 4, preferably smaller than 3.5, this being narrow for polyolefins.

Commercially available products E whose use is preferred are Exxelor® VA 1801 or 1803, Kraton® G 1901 FX or Fusabond® N NM493 D from Exxon, Kraton, and DuPont, and also Tafmer®MH 7010 from Mitsui, and also Lupolen® KR 1270 from BASF.

It is, of course, also possible to use a mixture of the rubber types listed above.

The functionalized rubbers of component E react in the melt with component B and become finely dispersed therein. Particular preference is given to EP rubbers grafted with acrylic acid or with maleic anhydride, and to ethylene-acrylic acid copolymers and ethylene-octene copolymers graft with maleic anhydride, to SEBS rubbers grafted with maleic anhydride, and also to ethylene-butene copolymers grafted with maleic anhydride or with acrylic acid.

Component F

The thermoplastic molding compositions of the invention can comprise, as component F, one or more fibrous or particulate fillers. Preferred fibrous fillers or fibrous reinforcing materials are carbon fibers, potassium titanate whiskers, aramid fibers, and particularly glass fibers. When glass fibers are used, these can have been provided with size and with a coupling agent, to improve compatibility with the matrix material. The diameter of the carbon fibers and glass fibers used is generally in the range from 6 to 20 μm. The form in which the glass fibers are incorporated can either be that of short glass fibers or else that of continuous-filament strands (rovings). The preferred average length of the glass fibers in a finished injection molding is in the range from 0.08 to 0.5 mm.

The form in which carbon fibers or glass fibers are used can also be that of wovens, mats, or glass silk rovings.

Suitable particulate fillers are amorphous silica, magnesium carbonate (chalk), powdered quartz, mica, talc, feldspar, glass beads, and in particular calcium silicates, such as wollastonite, and kaolin (in particular calcined kaolin).

Particularly preferred combinations of fillers are those composed of glass fibers and wollastonite.

Further additives can be used as component G. Examples of these are flame retardants, dyes, pigments, or stabilizers, examples being heat stabilizers or UV stabilizers, and also lubricants, or demolding aids.

The molding compositions of the invention preferably comprise less than 0.1% by weight of phthalic anhydride. It is particularly preferable that the molding compositions comprise no phthalic anhydride.

The invention also provides a process for the production of the thermoplastic molding compositions described above, by mixing components A-E and, if appropriate, F and G in any desired sequence with one another.

The sequence in which the components are mixed is as desired. By way of example, it is possible to produce the molding compositions by mixing the starting components in conventional mixing apparatuses, such as screw-based extruders, preferably twin-screw extruders, or in Brabender mixers or Banbury mixers, or else in kneaders, and then extruding the same. The extrudate is cooled and comminuted. The sequence of mixing components can be varied, and it is therefore possible to premix two or, if appropriate, three components. However, it is also possible to mix all of the components together.

Intensive mixing is advantageous in order to obtain maximum homogeneity of mixture. Average mixing times required for this are generally from 0.2 to 30 minutes at temperatures of from 240 to 300° C., preferably from 245 to 290° C. The extrudate is generally cooled and comminuted.

According to one preferred embodiment of the invention, component E is first premixed with at least one portion of component B to give a masterbatch, preferably with melting, and this is then mixed with the further components of the thermoplastic molding composition. This considerably facilitates and accelerates a uniform mixing process. Component E can thus be bound in finely dispersed form to component B.

One of the features of the molding compositions of the invention is improved fracture energy at −30° C. Another feature of these materials is lower tendency toward formation of mold deposit. They also exhibit fewer tiger lines.

The thermoplastic molding compositions of the invention can be used for the production of moldings, fibers, and foils. In particular, they are used for the production of moldings. The moldings here are preferably used in motor-vehicle components or in electronics equipment. It is particularly preferable here that the motor-vehicle components have exposure to weathering during operation, i.e. during operation of the motor vehicle. It is particularly advantageous that the thermoplastic molding compositions are used for the production of fittings used in Cabriolets. Because Cabriolets are designed to have open tops, components exposed to UV radiation and weathering also include those in the interior of the vehicle.

The molding compositions of the invention exhibit particular advantages in the production of pale-color moldings, because they have very little intrinsic color and give no, or only marginal, texturing when processed by injection molding.

The invention also provides moldings, fibers, and foils composed of the molding compositions of the invention.

The examples below provide further explanation of the invention.

EXAMPLES

Production and Testing of Molding Compositions

The intrinsic viscosity of the polyamides is determined to DIN 53 727 on 0.5% strength by weight solutions in 96% by weight sulfuric acid. The intrinsic viscosity of the styrene co- or terpolymers is determined in 0.5% strength by weight DMF solution at 25° C.

The heat resistance of the specimens was determined by means of the Vicat softening point. The Vicat softening point was determined to DIN 53 460, using a force of 49.05 N and a temperature rise of 50 K per hour, on standard small specimens.

The notched impact resistance of the products was determined on ISO specimens to ISO 179 1eA.

Flowability was determined to ISO 1133, at 240° C. using a loading of 5 kg.

Fracture energy was determined to ISO 6603 and on plaques (60 60 3 mm$^3$) at −30° C. Total energy $W_t$ was used here.

The plaques were manufactured at a melt temperature of 250, 270, or 290° C., and at a mold temperature of 60° C. The quality of the surface was assessed on plaques of dimensions 330 mm 120 mm 2 mm, produced at a melt temperature of 250° C. with a mold temperature of 60° C. The surface was assessed by the school-grade system (1: no tiger lines; 6: very many tiger lines).

The color of the specimens was determined visually after 1000 hours of xenon-test aging, and classified as 1 (no discoloration) to 5 (severe yellowing).

Component A

Styrene-acrylonitrile copolymer using 75% by weight of styrene and 25% by weight of acrylonitrile and having intrinsic viscosity of 80 ml/g (determined in 0.5% strength by weight DMS solution at 25° C.)

Component B 1

The polyamide B 1 used comprised a nylon-6, obtained from ε-caprolactam, with intrinsic viscosity of 150 ml/g (measured at 0.5% strength by weight in 96% strength sulfuric acid), e.g. Ultramid® B 3.

Component B 2

The polyamide B 2 used comprised a nylon-6, obtained from ε-caprolactam, with intrinsic viscosity of 130 ml/g (measured at 0.5% strength by weight in 96% strength sulfuric acid) and having a proportion of 0.16% by weight of triacetonediamine.

Components C 1 and C 2

Graft rubber having 62% by weight of polybutadiene in the core and 38% by weight of a graft shell composed of 75% by weight of styrene and 25% by weight of acrylonitrile, average particle size about 400 nm.

C 1: Fine-particle graft polymer, produced from

β1) 16 g of butyl acrylate and 0.4 g of tricyclodecenyl acrylate, heated to 60° C. in 150 g of water with addition of 1 g of the sodium salt of a $C_{12}$-$C_{18}$ paraffin sulfonic acid, 0.3 g of potassium persulfate, 0.3 g of sodium hydrogen carbonate, and 0.15 g of sodium pyrophosphate with stirring. 10 minutes after the start of the polymerization reaction, within a period of 3 hours, a mixture composed of 82 g of butyl acrylate and 1.6 g of tricyclodecenyl acrylate was added. After monomer addition had ended, stirring was continued for a further hour. The resultant latex of the crosslinked butyl acrylate polymer had 40% by weight solids content, and the average particle size (weight average) was determined as 76 nm, the particle size distribution being narrow (quotient Q=0.29).

(β2) 150 g of the polybutyl acrylate latex obtained in β1) were mixed with 40 g of a mixture composed of styrene and acrylonitrile (ratio by weight 75:25) and 60 g of water, and heated for 4 hours to 65° C., with stirring, after addition of a further 0.03 g of potassium persulfate and 0.05 g of lauroyl peroxide. Once the graft copolymerization reaction had ended, the polymerization product was precipitated at 95° C. from the dispersion by means of calcium chloride solution, washed with water, and dried in a stream of warm air. The degree of grafting of the graft copolymer was 35%, and the particle size was 91 nm.

$C_2$: Coarse-particle graft polymer, produced as follows:

(β3) the following were added at 60° C. to an initial charge composed of 1.5 g of the latex produced in β1 after addition of 50 g of water and 0.1 g of potassium persulfate, in the course of 3 hours, firstly a mixture composed of 49 g of butyl acrylate and 1 g of tricyclodecenyl acrylate, and secondly a solution of 0.5 g of the sodium salt of a $C_{12}$-$C_{18}$ paraffin sulfonic acid in 25 g of water. The polymerization reaction was then continued for 2 hours. The resultant latex of the crosslinked butyl acrylate polymer had 40% solids content. The average particle size (weight average) of the latex was determined as 430 nm, and the particle size distribution was narrow (Q=0.1).

(β4) 150 g of the latex produced in β3 were mixed with 20 g of styrene and 60 g of water and heated to 65° C. for 3 hours, with stirring, after addition of a further 0.03 g of potassium persulfate and 0.05 g of lauroyl peroxide. The dispersion obtained in this graft copolymerization reaction was then polymerized for a further 4 hours with 20 g of a mixture composed of styrene and acrylonitrile in a ratio by weight of 75:25. The reaction product was then precipitated at 95° C. from the dispersion by means of a calcium chloride solution, isolated, washed with water, and dried in a stream of warm air. The degree of grafting of the graft copolymer was determined at 35%; the average size of the latex particles was 510 nm.

CV: Graft rubber using 62% by weight of polybutadiene and 38% by weight of a graft shell composed of 75% by weight of styrene and 25% by weight of acrylonitrile, average particle size about 400 nm.

Component D

The component D used comprised a styrene-acrylonitrile-maleic anhydride terpolymer whose composition was 74.4/23.5/2.1 (% by weight), intrinsic viscosity: 66 ml/g.

Component E

Tafmer® MH 7010: ethylene-1-butene copolymer using 67.9% of ethylene and 31.6% by weight of butene, and functionalized using 0.5% by weight of maleic acid.

Component E*

Compounded material composed of 80 parts of component B 1 and 20 parts of E, produced via compounding in the melt in a ZSK 30 at 250° C., throughput 10 kg/h, and rotation rate 250 rpm.

Production of Molding Compositions of the Invention

The components were mixed at a melt, temperature of from 240 to 260° C. in a twin-screw extruder. The melt was passed through a water bath and pelletized.

Table 1 lists the results of the tests.

TABLE 1

| | Molding composition | | | | | | | | | | |
|---|---|---|---|---|---|---|---|---|---|---|---|
| | V1 | V2 | V3 | V4 | 5 | 6 | 7 | V8 | 9 | 10 | 11 |
| A | 19 | 19 | 19 | 19 | 19 | 19 | 19 | 14 | 14 | 14 | 14 |
| B1 | — | — | — | 41 | 41 | 41 | 41 | 53 | 53 | 41 | — |
| B2 | 41 | 41 | 41 | — | — | — | — | — | — | — | 41 |
| C1 | — | 35 | — | — | — | — | 31 | — | — | — | — |
| C2 | — | — | 35 | 35 | 31 | 33 | — | — | 24 | 24 | 24 |
| CV | 35 | — | — | — | — | — | — | 28 | — | — | — |
| D | 5 | 5 | 5 | 5 | 5 | 5 | 5 | 5 | 5 | 5 | 5 |
| E | — | — | — | — | 4 | 2 | 4 | — | 4 | — | — |
| E* | — | — | — | — | — | — | — | — | — | 16 | 16 |
| Vicat B [° C.] | 104 | 105 | 104 | 104 | 103 | 104 | 103 | 114 | 115 | 116 | 116 |
| MVI [ml/10'] | 19.6 | 23.6 | 22.4 | 34.4 | 28.6 | 31.2 | 26.7 | 26.1 | 32.1 | 31.3 | 72.2 |
| Ak, RT [kJ/m²] | 59.5 | 16.7 | 15.6 | 42.1 | 34.2 | 21.3 | 45.1 | 61.2 | 46.2 | 60.1 | 68.2 |
| Color | 2 | 1 | 1 | 1 | 1 | 1 | 1 | 1-2 | 1 | 1 | 1 |
| $W_{t, -30° C.}$ [Nm] | | | | | | | | | | | |
| 250° C. | 49.8 | 11.2 | 21.2 | 16.5 | 56.3 | 46.4 | 54.1 | 62.1 | 64.2 | 69.1 | 67.2 |
| 270° C. | 43.7 | 10.6 | 20.4 | 15.4 | 57.1 | 45.1 | 51.1 | 43.2 | 59.5 | 70.5 | 68.4 |
| 290° C. | 13.8 | 11.3 | 18.9 | 15.1 | 54.5 | 46.4 | 53.2 | 27.1 | 56.4 | 67.8 | 66.2 |
| Tiger lines | 3.5 | 3 | 3 | 3 | 2 | 2 | 2 | 2.5 | 1.5 | 1.5 | 1.5 |

The molding compositions of the invention have improved weathering resistance and surface quality. In comparison with the prior art, products having markedly improved fracture energy at −30° C. are obtained. Surprisingly, the products of the invention also have lower dependency of fracture energy on melt temperature.

The invention claimed is:

1. A thermoplastic molding composition, consisting of
   a) as component A, from 3 to 78% by weight of one or more styrene copolymers which have no units derived from maleic anhydride,
   b) as component B, from 15 to 90% by weight of one or more polyamides,
   c) as component C, from 5 to 50% by weight of one or more impact-modifying graft rubbers without olefinic double bonds in the rubber phase, whereby the graft rubbers are core-shell rubbers composed of at least one hard and one soft constituent, whereby the soft constituent derives from butylacrylate and the hard constituent derives from styrene, 2-methylstyrene and copolymers comprising styrene 2-methylstyrene, or acrylonitrile,
   d) as component D, from 1 to 25% by weight of one or more styrene copolymers which have, based on the entire component D, from 0.5 to 5% by weight of units derived from maleic anhydride,
   e) as component E, from 1 to 30% by weight of one or more further rubbers based on olefinic monomers without core-shell structure, and having at least 0.1% by weight of functional monomers, f) as component F, from 0 to 50% by weight of one or more fibrous or particulate fillers, g) as component G, from 17 to 40% by weight of further additives, wherein component G is selected from the group consisting of flame retardants, dyes, pigments, stabilizers, demolding aids, and combinations thereof;

where the entire amount of components A to G does not exceed 100% by weight;

wherein component E is a copolymer comprising e1) from 35 to 89.95% by weight of ethylene, as component E1, e2) from 10 to 60% by weight of 1-octene, 1-butene, propene, or a mixture thereof, as component E2, and e3) from 0.05 to 5% by weight of functional monomers, where the monomers bear functional groups selected from the group consisting of carboxylic acid groups, carboxylic anhydride groups, carboxylic ester groups, carboxamide groups, carboximide groups, amino groups, hydroxy groups, epoxide groups, urethane groups, oxazoline groups, and mixtures thereof.

2. The molding composition according to claim 1, wherein component D has from 1.0 to 2.5% by weight of units derived from maleic anhydride.

3. The molding composition according to claim 2, wherein component D has from 1.7 to 2.3% by weight of units derived from maleic anhydride.

4. The molding composition according to claim 1, wherein the molding composition comprises less than 0.1% by weight of phthalic anhydride.

5. The molding composition according to claim 1, wherein component B has from 0.05 to 0.5% by weight of triacetonediamine (TAD) end groups.

6. The molding composition according to claim 1, wherein component D is a styrene-acrylonitrile-maleic anhydride (MSA) terpolymer or styrene-N-phenylmaleinimide-maleic anhydride terpolymer.

7. The molding composition according to claim 1, wherein component A is a styrene-acrylonitrile copolymer.

8. The molding composition according to claim 1, wherein component C is an acrylate-styrene-acrylonitrile (ASA) graft rubber.

9. A process for the production of thermoplastic molding compositions according to claim 1, which comprises mixing components A to E and G, and optionally F with one another, wherein component E is first premixed with at least one portion of component B to give a masterbatch, which is then mixed with the further components of the thermoplastic molding composition.

10. A molding, fiber, or foil comprising the thermoplastic molding composition according to claim 1.

11. The molding, fiber, or foil of claim 10, wherein the molding is a motor-vehicle component or part of electronic equipment.

* * * * *